United States Patent
Neuberger

(10) Patent No.: US 6,531,186 B1
(45) Date of Patent: Mar. 11, 2003

(54) PROCESS FOR PRODUCING TRANSFER PRINTING PAPER

(76) Inventor: Manfred Neuberger, Goethestrasse 42, D-63543 Neuberg (DE)

( * ) Notice: Subject to any disclaimer, the term of this patent is extended or adjusted under 35 U.S.C. 154(b) by 0 days.

(21) Appl. No.: 08/737,118

(22) PCT Filed: Apr. 15, 1995

(86) PCT No.: PCT/DE95/00529

§ 371 (c)(1),
(2), (4) Date: Dec. 19, 1996

(87) PCT Pub. No.: WO95/29065

PCT Pub. Date: Nov. 2, 1995

(30) Foreign Application Priority Data

Apr. 23, 1994 (DE) .......................................... 44 14 270

(51) Int. Cl.[7] .............................. B05D 1/28; B05D 5/00
(52) U.S. Cl. ........................ 427/428; 427/146; 427/152
(58) Field of Search ................................ 427/146, 147, 427/148, 152, 428; 101/152

(56) References Cited

U.S. PATENT DOCUMENTS

| | | | | |
|---|---|---|---|---|
| 3,857,746 A | * | 12/1974 | Blanco et al. | 156/89 |
| 3,871,879 A | * | 3/1975 | Arai | 96/1.2 |
| 3,918,895 A | * | 11/1975 | Mizuno | 8/2.5 |
| 4,006,050 A | * | 2/1977 | Hurst et al. | 156/234 |
| 4,367,110 A | * | 1/1983 | Yoshikawa | 156/219 |
| 4,636,332 A | | 1/1987 | Craig | |
| 5,115,254 A | * | 5/1992 | Onishi et al. | 346/76 PH |
| 5,308,684 A | * | 5/1994 | Nakatsuka et al. | 428/202 |
| 5,406,681 A | * | 4/1995 | Nakayama et al. | 428/215 |

FOREIGN PATENT DOCUMENTS

| | | |
|---|---|---|
| DE | 4203162 | 5/1993 |
| EP | 0 034 817 | 9/1981 |
| JP | 05 123 635 | 9/1993 |

* cited by examiner

*Primary Examiner*—Michael Barr
(74) *Attorney, Agent, or Firm*—Collard & Roe, P.C.

(57) ABSTRACT

The invention is concerned with a process of producing transfer printing papers for thermally applying colored, in particular, varicolored images, letters and/or decorations on items retaining their shape at high firing temperatures, in particular, of ceramics or glass, with the ceramic color pigments dissolved in the printable ink substrate being transferred in the rotagravure process to the printing paper, with the color pigments prior to their being transferred to the rotagravure cylinder being held in homogeneous distribution in the release substrate. According to the invention using cup depths commonly employed in conventional rotagravure processes still lying within the range of between 20 and 60 $\mu$m, ceramic color pigments are employed the glass particle proportion of which, at least in the non-red color pigments, as against the previously usual glass particle proportion, is reduced in the ink substrate. It is only with this process that the reproducibility of the images during firing and heating, respectively, of the items and their optimally briallant quality are ensured.

6 Claims, 1 Drawing Sheet

PROCESS FOR PRODUCING TRANSFER PRINTING PAPER

The present invention is concerned with a process of producing transfer printing papers.

Transfer printing papers are employed for thermally applying colored images, in particular, varicolored pictures, letters and/or decorations on items retaining their shape at high firing temperatures, in particular, of ceramics or glass, in which the printable ceramic coloring pigments in a release composition are transferred to the transfer printing paper in the rotogravure process and are kept in homogeneous distribution in the release composition before their transfer to the rotogravure cylinder. A process of this type is taught by DE-A-42 03 162. This process was developed after it had been found that the quality of the transfer printing papers obtained in usual rotogravure processes was unsatisfactory. Compared thereto, the process according to DE-A-42 03 162 employing commercially available ceramic coloring pigments resulted in substantially improved replicas of the respective master. However, in the meanwhile, it has been found that no consistently uniform, i.e. reproducible duplication brilliance, is obtainable for all transfer papers printed in one batch, quite apart from the fact that the oversized cup depth deemed imperative in the process according to DE-A42 03 162 to enable a large amount of printing ink to be admitted, involves unsatisfactory results inasmuch as no consistently good printed products and, in consequence, no consistently good burning results are achievable.

The cup depth in conventional rotogravure printing, depending on the type of manufacture of the cups (etching or gravure), is between 2 $\mu$m or 7 $\mu$m, respectively, and about 60 $\mu$m, with light areas of the master being taken into account by cups of a lower depth and dark areas by correspondingly deeper cups.

Hereinafter the following terminology will be used conveying the following meaning:

color pigments: dye particles with no glass addition;

ceramic color pigments: dye particles to which glass is added;

binder: the proportion in the printable ink composition binding the pigment and ceramic color pigments and being adjusted by organic solvents for rotagravure to the proper viscosity:

ink quantity: amount of the printable ink composition introducible into the cups.

Starting from the process of manufacturing transfer printing papers according to DE-A-42 03 162, it is the object of the invention to improve this process to safeguard the reproducibility of the images during the firing or heating of the items, and their optimally brilliant quality.

This problem is solved by the process of the invention in that, for printing the transfer paper, cup depths of between 20 $\mu$m and 60 $\mu$m are used, depending on the tinting of the master and the ceramic coloring pigments whose glass particle proportion, at least in the non-red pigments, is reduced as against the previously usual proportion in the substrate.

Hence, according to the present invention selected cup depths are used which are essentially in the range of between 20 and 60 $\mu$m, preferably between 30 and 60 $\mu$m which, as compared to DE-A-42 03 162, also results in a correspondingly reduced amount of ink introducible into the cups, since cup depths of up to 100 $\mu$m are deemed necessary according to the prior art suggestion.

However, the specific selection of cup depths alone will not yet solve the problem encountered. Ceramic colouring pigments have, depending on the manufacturer of the pigments, a relatively high glass particle proportion in the order to about 70 to 80%, it being impossible to precisely define the association of the glass particles to the coloring pigments, i.e. to define whether, in part, they are agglomerated or, in part enclose the pigments entirely or only partially. It can only be assumed that, in particular, the high glass proportion and, possibly, the association or connection thereof to the pigments are responsible for the lack of a safe reproducibility of the images on the fired or heated items, especially so as DE-A-42 03 162 teaches that large amounts of ceramic coloring pigments had to be applied to the transfer printing paper through cups of great depth so that along therewith correspondingly large amounts of glass particles and, in particular, of binder (criticality of which, in the meanwhile, has been identified) were introduced into the print. Only for the sake of completeness it is pointed out that also in the present instance printing is effected on a transfer paper coated with a gelatine, wax or gum arabic layer, with the final print being provided with a socalled "transfer lacquer" coating.

Hence, starting from the process according to DE-A-42 03 162, on the one hand, it is of decisive importance for a reproducible duplication brilliance of the master on the final product, to use cup depths commonly employed in rotagravure processes by focusing on a specific range of cup depths and, on the other hand, to reduce the glass proportion, i.e. the glass particle share of the ceramic coloring pigments must be correspondingly lower than that of commercially available ceramic coloring pigments.

The reduction of the glass particle share is easily reached—if pigment manufacturers are not able to directly supply ceramic coloring pigments of a correspondingly reduced glass particle share as provided for according to the invention—in that pure coloring pigments, i.e. pigments containing no glass, are added in corresponding dosages to the commercially available ceramic coloring pigments having high glass proportions, so that the glass proportion of an ink substrate will contain a correspondingly reduced amount of glass. Apart therefrom, the transfer printing paper manufactured according to the process of the invention not only does contain a correspondingly reduced amount of glass but also contains less binder in each of the cups and larger amounts of coloring pigments instead because—as compared with the process according to DE-A-42 03 162—due to the lower cup depth a correspondingly lower amount of ink is introduced. As, on the one hand, cup depths, essentially, are in the afore-mentioned range and, on the other hand, color tints will have to be taken into account, this will be preferably achieved by corresponding cross-sectional dimensions (in plan view) of the cups and by the spacing at which they are arranged, as opposed to conventional rotagravure processes according to which, as a rule, this is achieved only by cup depths differing for the individual inks, with consistently equal-sized cup openings in the range of about 2 $\mu$m to about 60 $\mu$m being used. The "at least the non-red coloring pigments" restriction as referred to is based on that it has been found that, during firing, it is imperative for the high glass share to be present in red ceramic coloring pigments in order to maintain the red colour effect during firing. Accordingly, commercially available red ceramic coloring pigments containing a relatively high proportion can be readily used for the color red; however, this does not exclude a reduction in the glass proportion even in the red colour should the glass share, depending on the manufacturer, be particularly high.

Hence, the process of the invention—compared to the process according to DE-A-42 03 162—insures, when using cup depths in the indicated range that, with a correspondingly reduced glass proportion in the substrate, a larger amount of coloring pigments can be introduced into each of the cups, this being not effected through enhanced cup depths but rather through an increased share of the coloring pigment in the respective dye substrate. Since, moreover, lower cup depth are used than in the process of DE-A-42 03 162, each of the cups contains less binder.

In respect of hard porcelain it has proved advantageous to overprint at least one printed ink layer or at least the uppermost layer among a plurality of ink layers with a final layer of glass particles, to thereby quasi restore the reduced glass proportion so that, during firing, each of the pigment particles is safely bonded in the glass. Glass particles sized about 3 to 5 $\mu$m are used for cover layers of this type, with the glass particle layer being applied in a thickness of, for example, up to between 20 and 30 $\mu$m which can, for example, also be done by printing. The ratio of solvent and binder to ceramic coloring pigments suggested by DE-A-42 03 162 is not substantially changed, although in the present instance less glass and, in particular, also less binder, are contained in the printable ink substrate. In this respect, reference is made to the following embodiment.

The transfer printing papers manufactured according to the process of the invention are especially suitable for use with ceramics, china and glass and, optionally, also with metallic items in respect of which the transfer papers manufactured according to the invention not only do involve the advantage that objects, such as tiles, in an extremely low-cost way, can be decorated with fanciful designs but also do involve the option to replace, in a non-polluting way, bottle labels of paper by burnt-in designs of whatever fanciful character, with the latter, in general, being even less costly than paper labels in respect of which disposal must be provided for after use and removal thereof.

If due to particularly pale areas of the master the cup depths need not be less than 30 $\mu$m, the process of the invention preferably employs printing blocks respectively having an invariable cup depth for each ink with the different inking in print being, as mentioned before, achieved by the spacings at which the cups are arranged and/or by cross-sectional dimensions varied in accordance with the master.

The transfer printing papers manufactured according to the process of the invention also can be used for soft porcelains (bone china). However, since soft porcelains, as mentioned hereinbefore, are provided with a glaze it will in that case not be required to coat the transfer papers with a thin layer of glass particles—as is done, with advantage, in transfer papers for hard porcelain—for, the print transferred to the glaze by a transfer lacquer, i.e. the colouring pigments and ceramic pigments, during firing, are adequately safely melted into the glaze.

The particle size of the color pigments in the process of the invention is approximately <10 $\mu$m, preferably <5 $\mu$m. In connection with the process of the invention it has, moreover, proved to be advantageous for achieving, in printing, an optimum transition of the dye from the cup to the transfer paper, to use non-undercut cups of the type known per se in traditional rotogravure processes. The specific use of this type of cups completely open toward the printing side according to another embodiment of the process of the invention, in the present instance, is of a special significance as it is of primary importance to completely evacuate the cups during printing and to transfer the contents thereof to the transfer printing paper.

The reason for indicating only ranges and approximate figures for the cup depths and proportions is that ceramic coloring pigments supplied by different manufacturers always are differing from one another to a certain degree. However, on the one hand, always the reduction of the glass proportion in conjunction with an increased share of the coloring pigment and, on the other hand, the pointed resort to cup depths commonly used in traditional rotogravure remain of decisive importance, with the latter involving again a lower amount of binder in the cups and, hence, in the transfer printing paper.

If suppliers or manufacturers are unable to indicate or to reliably indicate the glass proportion contained in the ceramic coloring pigments, it will be necessary for the manufacturer of transfer printing papers to determine the glass share in order to be able to add, on the basis thereof, the required amount of coloring pigments.

Further features and embodiments of the invention will now be described with reference to the drawing wherein FIG. 1 is a schematically shown and greatly enlarged sectional view of a transfer paper for hard porcelain;

Figure 1:
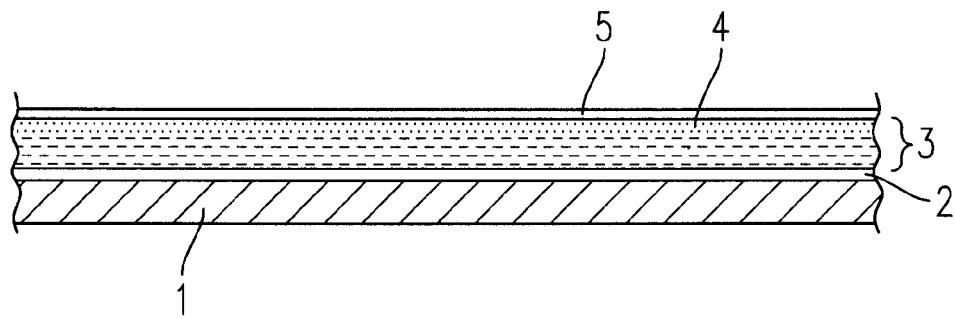
Figure 2:
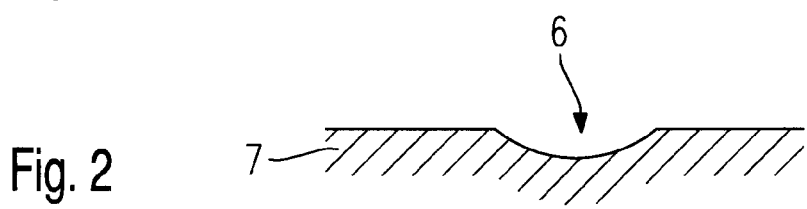
FIG. 2 is a greatly enlarged sectional view of a cup in the rotogravure block.
Figure 3:
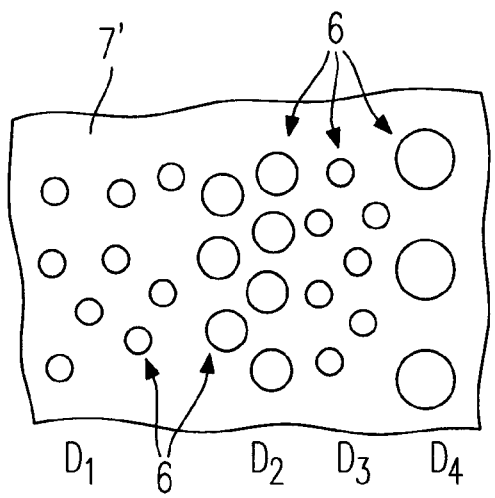
FIG. 3 is a greatly enlarged view of a pattern of arrangement of cups within the printing block.

The graphically greatly enlarged illustration according to FIG. 1 shows the layered pattern of a transfer printing paper for hard porcelain manufactured in the colour rotogravure process, wherein reference numeral 1 designates the paper, numeral 2 the gelatine, wax or gum arabic layer, 3 refers to the ink layers printed in the respective raster, 4 to the covering glass particle layer and numeral 5 to the covering transfer lacquer layer. As mentioned before, transfer printing paper for soft porcelain is not provided with a layer 4 of glass particles. In pale areas of the master, the sizes of the openings of the cups 6 tend to be smaller and the arrangement of the cups is at larger intervals while in deep colour areas it is the other way round as schematically illustrated in FIG. 3 showing a surface section 7' of the rotagravure cylinder 7 with different opening sizes of the cups 6 arranged at different spaces $D_1$ to $D_4$ in accordance with a corresponding tinting of the master. FIG. 2 shows that the cups 6 preferably generated by etching at the top are completely open thereby insuring that the amount of ink introduced into the cups is transferred, in constant amounts, to the transfer printing paper.

Figure 4:
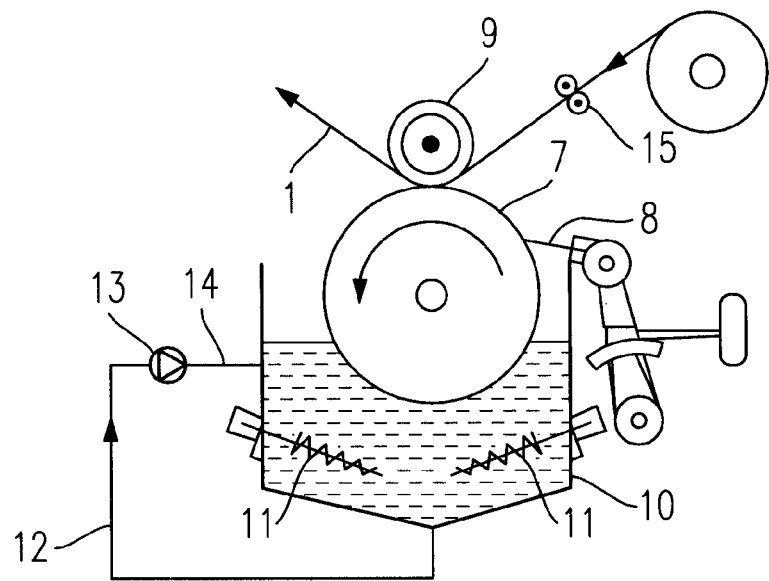
FIG. 4 is the inking system for printing ink on a continuously operating rotogravure machine not otherwise shown.

The rotogravure printing machine for carrying into effect the process, in known manner and according to FIG. 4, consists of a rotogravure cylinder 7 including blade 8 and associated printing cylinder 9, ink reservoir 10 from which the ink is transferred directly, as shown, or indirectly by means of a transfer cylinder, to the rotogravure cylinder 7, and of conveyor elements 15 for feeding the transfer paper 16 to be printed to between the rotagravure cylinder 7 and printing cylinder 9.

In order to be able to transfer the ink substrate in the rotogravure process to the transfer paper 1 by printing and in order to hold the pigments prior to their transfer to the rotogravure cylinder 7 in homogeneous distribution in the ink substrate, a homogenizer maintaining the pigments homogeneously distributed is provided in the ink reservoir 10, as shown in FIG. 4 according to which, for example, two quick-running screw stirrers 11 protrude into the reservoir 10. In lieu thereof or in addition thereto, it will also be possible, as shown, to provide on the reservoir 10 a recirculating conduit 12 with a recirculating pump 13, with the pump 13, feasibly, being arranged on the return flow nozzle 14 terminating a the top of the reservoir 10. The required ink-feeding conduit and an overflow for maintaining the level of immersion for the rotogravure cylinder 7 have not been shown on the reservoir 10.

It is only for the sake of completeness that reference is made to the fact that in the three- or four-color print of transfer paper, three or four printing systems will have to be series arranged as shown in FIG. 4.

The values for a four-colour print of the transfer paper will arise from the following embodiment relating to transfer printing paper for hard porcelain. The same values apply to soft porcelain; however, as mentioned before, it has no coating layer 4 of glass particles printed on the transfer printing paper.

EXAMPLE

Manufacture of Transfer Printing Paper for Hard Porcelain

The following composition was used for the binder:

|  | parts per thousand |
| --- | --- |
| butyl acetate | 570–640 |
| butyl benzylphthalate | 50–70 |
| methyl methacrylate | 190–210 |
| ethyl acetate | 90–110 |
| polyethylene wax dispersion | 25–95 |

Compared therewith, the agent for preparing the glass particle composition consists of methacrylate dissolved in an aromatic composition, and plasticizers.

Butyl benzylpthalate is a so-called screen printing oil manufactured by Heraeus, Reg. No. 200195.

Hence, apart from the cup depths as used (Table IV), the ink composition according to Table III is of importance according to which the ink preparations for the print contain, in average, about 46% of binder, about 43% of ceramic coloring pigments and about 16% of pure coloring pigments reducing the proportion of the glass in the ink substrate.

TABLE I

| Ceramic Coloring Pigments | Pigment Size $\mu$m | Glass Proportion % | Make |
| --- | --- | --- | --- |
| blue | <5 | 75 | Cerdec 121515 |
| yellow | <5 | 90 | Heraeus Ho4336/2ff |
| red | <5 | 80 | Cerdec 14 566 |
| black | <5 | 78 | Cerdec 14 209 |

TABLE II

| Coloring Pigments (without glass) | Pigment Size $\mu$m | Make |
| --- | --- | --- |
| blue | <5 | Cerdec 21 544 |
| yellow | <5 | Heraeus 39332/2/2ff |
| red | — | not applicable |
| black | <5 | Cerdec 24 137 |

TABLE III

| Ink composition (for print) | Binder % | Ceramic Coloring Pigments % | Coloring Pigments % |
| --- | --- | --- | --- |
| blue | 53 | 33 | 14 |
| yellow | 40 | 52 | 8 |
| red | 40 | 60 | — |
| black | 50 | 25 | 25 |

TABLE IV

| Cup Depths | $\mu$m |
| --- | --- |
| blue | 40 |
| yellow | 55 |
| red | 40 |
| black | 35 |

Depending on the tint of the master the cup openings are in the order of between 8 and 150 $\mu$m.

Coating Layer of Glass Particles:

Particle size: <5 $\mu$m, layer thickness about 8 $\mu$m

Glass particle preparation: mixing agent 50% glass particles 50%.

What is claimed is:

1. A process of producing transfer printing papers for thermally applying colored images to objects retaining their shapes at high firing temperatures, which comprises the steps of (a) preparing printable ink compositions containing coloring pigments of the color red and colors other than red, the printable ink compositions containing colors other than red being prepared by reducing the proportion of 70% to 80% of glass particles in a ceramic coloring pigment of a color other than red by at least 10%, replacing the proportion of the glass particles by which the ceramic coloring pigment has been reduced by a pure coloring pigment of the color other than red, and homogeneously distributing the ceramic coloring pigment and the pure coloring pigment in the printable ink composition, (b) filling a multiplicity of cups in a rotogravure cylinder with the printable ink composition, (1) the cups having a depth of 20 $\mu$m to 60 $\mu$m, the depth of the cups increasing with an increase in the darkness of areas in a master to be reproduced, and (c) transferring each printable ink composition in a rotogravure process from the cups in the rotogravure cylinder to the transfer printing papers.

2. The process of claim 1, wherein the cups have edges which are not undercut.

3. The process of claim 1, wherein the objects are of ceramic or glass.

4. The process of claim 1, comprising covering a printed layer of the printable ink compositions on the transfer printing papers with a layer of glass particles.

5. The process of claim 4, wherein the glass particles in the covering layer have a particle size of less than 10 $\mu$m.

6. The process of claim 5, wherein the glass particle size is between 3 $\mu$m and 5 $\mu$m.

* * * * *